(12) United States Patent
Ehmann et al.

(10) Patent No.: US 12,040,574 B2
(45) Date of Patent: Jul. 16, 2024

(54) DEVICE FOR INTRODUCING CABLES THROUGH AN OPENING

(71) Applicant: ICOTEK PROJECT GMBH & CO. KG, Eschach (DE)

(72) Inventors: Valentin Ehmann, Schwabisch Gmund (DE); Bruno Ehmann, Mogglingen (DE)

(73) Assignee: ICOTEK PROJECT GMBH & CO. KG, Eschach (DE)

( * ) Notice: Subject to any disclaimer, the term of this patent is extended or adjusted under 35 U.S.C. 154(b) by 234 days.

(21) Appl. No.: 17/601,894

(22) PCT Filed: Mar. 25, 2020

(86) PCT No.: PCT/EP2020/058272
§ 371 (c)(1),
(2) Date: Oct. 6, 2021

(87) PCT Pub. No.: WO2020/207796
PCT Pub. Date: Oct. 15, 2020

(65) Prior Publication Data
US 2022/0216649 A1      Jul. 7, 2022

(30) Foreign Application Priority Data
Apr. 10, 2019   (DE) .......................... 102019205115.4

(51) Int. Cl.
*H01R 13/625*     (2006.01)
*H01R 13/512*     (2006.01)
(Continued)

(52) U.S. Cl.
CPC ..... *H01R 13/62933* (2013.01); *H01R 13/512* (2013.01); *H01R 13/5205* (2013.01); *H02B 1/305* (2013.01)

(58) Field of Classification Search
CPC .............. H01R 13/512; H01R 13/5205; H01R 13/5202; H01R 13/62933; H02B 1/305
(Continued)

(56) References Cited

U.S. PATENT DOCUMENTS 3,077,444 A * 2/1963 Hoh ........................ C23C 14/22
                                                            204/192.15
3,190,772 A * 6/1965 Berghaus ................. C21D 1/38
                                                            148/279
(Continued)

FOREIGN PATENT DOCUMENTS

DE          10225046          4/2003
DE          10225046 A1  *   4/2003    ............. H02G 3/083
(Continued)

OTHER PUBLICATIONS

Office Action for CN2020800399585, Mar. 14, 2003, 8 pages.
(Continued)

*Primary Examiner* — Abdullah A Riyami
*Assistant Examiner* — Vladimir Imas
(74) *Attorney, Agent, or Firm* — Faegre Drinker Biddle & Reath LLP

(57) ABSTRACT

The invention relates to a device for introducing lines through an opening having a frame arranged around the opening, which frame comprises slots for elastic grommets to receive the lines.

According to the invention, it is provided that a coupling housing of a coupling of a plug connection is formed integrally with the frame or with a breadboard matching one of the slots, wherein the coupling housing, the part of the frame connected thereto and/or the breadboard are adapted to be screwed to a plug housing of a plugged-in plug of the plug connection or to be clamped with at least one latch.

17 Claims, 5 Drawing Sheets

(51) Int. Cl.
*H01R 13/52* (2006.01)
*H01R 13/629* (2006.01)
*H02B 1/30* (2006.01)

(58) Field of Classification Search
USPC .......................................................... 439/345
See application file for complete search history.

(56) References Cited

U.S. PATENT DOCUMENTS

| | | | | |
|---|---|---|---|---|
| 3,258,634 | A * | 6/1966 | Rich | G01N 27/68 |
| | | | | 313/231.01 |
| 3,560,271 | A * | 2/1971 | Heinen | C21D 1/773 |
| | | | | 148/228 |
| 3,728,051 | A * | 4/1973 | Humbert | C23C 8/38 |
| | | | | 148/210 |
| 3,730,863 | A * | 5/1973 | Keller | C23C 8/36 |
| | | | | 148/222 |
| 3,855,110 | A * | 12/1974 | Quinn | H01J 37/34 |
| | | | | 204/192.12 |
| 5,155,300 | A | 10/1992 | Brandner | |
| 5,986,213 | A * | 11/1999 | Memmesheimer | H02G 3/083 |
| | | | | 174/77 R |
| 6,139,964 | A * | 10/2000 | Sathrum | H01J 37/3266 |
| | | | | 428/408 |
| 8,992,249 | B2 * | 3/2015 | Kobayashi | H01R 13/6581 |
| | | | | 439/564 |
| 9,407,036 | B2 | 8/2016 | Andresen et al. | |
| 10,680,423 | B2 | 6/2020 | Ehmann et al. | |
| 11,549,547 | B2 * | 1/2023 | Yuan | F16B 43/001 |
| 2006/0144136 | A1 | 7/2006 | Dutton et al. | |
| 2010/0046316 | A1 | 2/2010 | Hughes et al. | |
| 2014/0030921 | A1 | 1/2014 | Masaki | |
| 2015/0060065 | A1 | 3/2015 | Scharmach et al. | |
| 2016/0265330 | A1 | 9/2016 | Mazrooee et al. | |
| 2017/0033497 | A1 | 2/2017 | Germani | |
| 2018/0163528 | A1 | 6/2018 | Smith et al. | |

FOREIGN PATENT DOCUMENTS

| | | | | |
|---|---|---|---|---|
| DE | 10347653 | | 5/2005 | |
| DE | 10349996 | | 9/2013 | |
| DE | 102013014794 | | 3/2015 | |
| DE | 102016213873 | | 2/2017 | |
| DE | 102016213873 | A1 * | 2/2017 | ............... C25D 9/04 |
| DE | 102017220665 | | 5/2018 | |
| DE | 102018205702 | | 10/2019 | |
| DE | 102018218426 | | 4/2020 | |
| EP | 0430016 | | 6/1991 | |
| EP | 0430016 | A2 * | 6/1991 | ............... H02G 3/22 |
| EP | 2916409 | | 9/2015 | |
| EP | 2916409 | A2 * | 9/2015 | ............... H02G 3/22 |
| EP | 3404789 | A1 * | 11/2018 | ............... H02G 3/22 |
| EP | 2746634 | | 5/2021 | |
| WO | 2001042046 | | 6/2001 | |
| WO | 20180127512 | | 7/2018 | |

OTHER PUBLICATIONS

International Preliminary Report on Patentability received for PCT Patent Application No. PCT/EP2020/058272, mailed on Oct. 21, 2021, 13 pages.

International Search Report and Written Opinion received for PCT Patent Application No. PCT/EP2020/058272, mailed on Aug. 6, 2020, 36 pages.

* cited by examiner

DEVICE FOR INTRODUCING CABLES THROUGH AN OPENING

CROSS-REFERENCE TO RELATED APPLICATIONS

The present application is a 371 U.S. National Stage Application of International Application No. PCT/EP2020/058272 filed Mar. 25, 2020, which claims priority to DE 102019205115.4, filed Apr. 10, 2019, the disclosures of which are hereby expressly incorporated herein by reference.

BACKGROUND/SUMMARY

The disclosure relates to a device for introducing lines through an opening, in particular in a switch cabinet, according to the type defined in more detail in the preamble of claim 1.

For the introduction of lines, such as cables or media lines for compressed air, water, oil or the like, structures consisting of differently shaped frames, which are arranged at least partially around the opening for the introduction of the lines, are known. The frames are, for example, divided and have slots for elastic grommets which in turn accommodate the lines.

For example, DE 103 47 653 A1 shows a cable bushing which is made of two parts. In the embodiment variant described, it has slots for four individual grommets. In the exemplary embodiment shown, these grommets are made of an elastomer and can be opened via a slot in order to be able to directly receive pre-assembled cables, i.e. cables with connectors. They are then inserted into the slots, wherein they have a certain oversize with respect to the cable bushing or the slot, so as to reliably seal due to the deformation of the elastomer when the cable bushing is assembled, and at the same time to clamp the cable lying in a through-hole of the grommet in such a way that, in addition to sealing, a frictional connection and thus strain relief is ensured. The cable bushing in said specification can thereby be inserted into a round cutout of a wall, for example the wall of a switch cabinet, and screwed to this wall, for example, by means of a nut. It can also accommodate other lines in addition to cables.

An alternative embodiment is also known from WO 01/42046 A2. The difference is essentially that the cable bushing is designed here in the form of a frame consisting of two frame parts screwed together. The frame can then be screwed tightly around a corresponding through-opening, for example again of a switch cabinet, so that a tight structure is also achieved here. In this specification, it is further shown that the grommets may be of different sizes, for which corresponding slots of the appropriate size are then provided. Typically, the sizes of the grommets are correspondingly gridded, so that, for example, a comparable space can be used either for one grommet as a "large" slot or for two grommets lying one above the other and two next to each other as four "small" slots. In addition, structures are of course also conceivable which have only one slot for a single grommet.

An elastic grommet is also described, for example, in DE 103 49 996 A1. Another elastic grommet is known, for example, from DE 10 2017 220 665 A1. In addition to its elasticity, this grommet has the additional property that it is designed in an electrically conductive manner. Thus, in addition to strain relief and sealing, it can also provide electrical contacting, for example of a braided shield of a cable stripped in the region of the grommet. In this way, shielding can be implemented simply and efficiently in order to ensure the electromagnetic compatibility of the structures with the devices for line feed-in.

Furthermore, it is known, for example, from DE 102 25 046 A1 that the frame is arranged only indirectly around an opening, namely with an intermediate frame. This intermediate frame is screwed to the material surrounding the opening, for example the wall of a switch cabinet, and sealed accordingly. The actual frame can then be clipped into the intermediate frame, so that screwing of this actual typically separable frame can be dispensed with, and only the intermediate frame is connected to the wall of the switch cabinet. This allows each frame to be accommodated with easy detachment so that it can be disassembled and reassembled as required, ideally even without tools, for example if a line needs to be replaced or the configuration of the lines needs to be changed.

In practice, it is the case that such devices for introducing lines are frequently used in such a way that the lines are introduced directly and unseparated into the structure. For certain types of lines, however, a plug connection is frequently also desired, for example in order to be able to separate them if necessary. However, the plug connection always has the disadvantage that it is inferior to a direct introduction of the cables in terms of tightness and susceptibility to interference.

It is now the object of the present disclosure to disclose an improved device for the introduction of lines through an opening, for example in a switch cabinet or in a machine housing, which further improves the structures of the prior art.

According to the disclosure, this object is solved by a device having the feature in claim 1, and here in particular in the characterizing part of claim 1. Advantageous designs and further developments result from the subclaims dependent thereon.

The frame is preferably made in one or two parts, which preferably enclose the slots. The device for introducing lines according to the disclosure provides that the frame, in addition to slots for elastic grommets for receiving the lines via which lines can be guided through the frame, comprises at least one coupling housing of at least one coupling of a plug connection with this same coupling and a plug, which is formed in one piece with at least one part of the frame or with a breadboard matching one of the slots. In a very advantageous variant, the part of the frame thereby comprises the slots at least partially. The frame or one of its parts, if it is designed to be divisible, for example to accommodate the grommets, thus directly comprises the coupling or a coupling housing of the plug connection. Alternatively, it can be realized as a conventional frame, into which a breadboard can be inserted, which is designed in one piece with the coupling housing of a coupling of the plug connection. In this case, the coupling housing, the part of the frame connected thereto and/or the breadboard are designed to be screwed or clamped to a plug housing of an inserted plug of the plug connection, for which purpose at least one latch is then used.

This allows, for example, supply lines to be inserted directly and other lines such as control lines, pneumatic lines or the like to be designed in a plug-in manner. In practice, this always leads to the fact that the switch cabinet, the machine control or the like, into which the lines are to be inserted, has to be implemented in a significantly less complex manner, and in particular that several through-openings for a plug on the one hand and a classic line feed-in on the other hand can be dispensed with. The device thus becomes highly efficient and correspondingly flexible. By connecting the plug by screwing or bracing, a secure hold is ensured. This can be ensured in particular in the event of vibrations or tension on the cables or the plug.

It is particularly advantageous if the coupling housing or the plug housing according to an advantageous design of the disclosure has at least one latch, for example and preferably a pivotable latch, which is designed to tension and hold the plug of the plug connection in the direction of the coupling when it is inserted. Alternatively, two analogously acting latches on two sides of the coupling housing or plug housing are conceivable. This allows the plug to be fixed simply and efficiently, but also to be released again with corresponding ease. The fixing ensures strain relief in the event of tension on the plug or the lines connected to the plug and ensures that seals typically present between the coupling and the plug housing are under tension and can seal reliably. The latch can be made of plastic, fiber-reinforced plastic or sheet metal, for example.

An extraordinarily favorable and advantageous embodiment of the device according to the disclosure provides that the coupling housing is designed to accommodate modular coupling inserts, in particular in a module frame. Such modular coupling inserts are available for various plug connections from different manufacturers and are typically installed via a module frame which always has the same dimensions and is thus quasi-standardized. The individual modules can comprise plug connections for electrical supply and/or control lines, signal lines or data lines in a manner known per se. In addition, lines for water, lubricants or compressed air can also be arranged in one and the same plug and combined via the corresponding coupling modules to form an individual coupling. A plug also made up of plug-in modules can then form a highly flexible plug-in system with this individually designed coupling. The coupling housing in this particularly advantageous embodiment variant of the device according to the disclosure is now to be designed in such a way that it can accommodate the coupling modules, in particular in a corresponding module frame from different manufacturers, and thus simply and efficiently provides a highly flexible solution for plug connection of individual lines, for example for electrical power, signals and media. In addition, fixed wiring or fixed laying of lines can be carried out on one and the same frame, which can be accommodated in the line grommets known per se. The line grommets are elastic and provide sealing on the one hand and strain relief on the other. Together with a sufficiently tight plug, which for example fulfils the protection class IP67, a very good line feed-in is created which at the same time reliably seals the opening against water, dirt and the like.

According to a very advantageous further development of the idea, the elastic grommets are integrally made in a manner known per se and are each slotted laterally. They can thus be unfolded so that pre-assembled lines, which have, for example, plugs, connection flanges or the like, can also be inserted into the grommets, and that lines do not have to be pulled through the grommet over a greater length. This assembly is then inserted into the corresponding slots of the frame and in the process pressed together with the frame in order to ensure a tight and strain-relieving assembly.

In this case, it is also possible to design the structure in such a way that only the grommets are directly shielded, if the lines are cables with a shielding braid which is at least partially open in the area of the grommet. For this case, the grommets may be designed to be electrically conductive, as well as the frame, such that electrical contacting may be achieved, for example, with a metal housing of a switch cabinet or a machine, in order to shield the assembly accordingly. In this context, reference can be made, for example, to DE 10 2017 202 665 A1 of the applicant already described at the beginning.

The elastic grommets can be inserted in a form-fitting manner into the frame or its slots on at least two of their side edges in a manner known per se in order to ensure a good seal on the one hand and reliable strain relief on the other. In addition, the breadboard, if present, which is formed integrally with the coupling housing, can also be inserted into the frame in a form-fitting manner. Thus, a conventional frame with a breadboard provided with a coupling housing can be easily and efficiently upgraded to the device according to the disclosure, in particular for the application case that the frame is not integrally designed with the coupling housing.

When the breadboard is present, it is the case that, according to a very advantageous further development of the idea, this breadboard comprises sealing elements at least on one of the sides interacting with the frame. Such sealing elements can, for example, be inserted in a circumferential groove or be injection-molded onto the structure of the breadboard. This increases the tightness of the structure even in the event that both the frame and the breadboard are formed from a correspondingly hard material which, in the event of direct contact, would not provide a seal or at least not a seal which is so good that, for example, the protection class IP67 can be fulfilled.

The frame itself can be designed to be divisible transversely to the running direction of the lines, as is known from the prior art, but it does not have to be. There are structures in which the line grommets are inserted into the frame in the running direction of the cables and are pressed together with the frame. However, it is particularly advantageous if the frame is designed to be correspondingly divisible, so that the fitted elastic line grommets and, optionally, the coupling housing, which is ideally fitted with modular coupling inserts, can be inserted into the corresponding slots on the breadboard in the first frame part. By applying the second frame part, which, depending on where the frame is divided, could be referred to as the second frame half or also as the cover, the grommets with the lines inserted therein and the breadboard, if present, are then suitably pressed, and thus held and sealed. The coupling housing, when formed in two parts with the frame, is then formed with one of the parts, preferably the larger part, of the frame, both of which are in contact with the slots.

According to a very advantageous further development of this idea, the first and second frame parts can be designed to be screwed together, clipped together or closed by means of a clamping bracket lock and/or by means of a lever lock with at least one link guide. Screwing is significantly more complex than simply clipping or latching the cover, but can apply greater forces to reliably press the elastic grommets and any breadboard present or a seal running around the latter to the frame and thus increase the seal. Depending on the structure, however, a correspondingly high force for pressing the grommets and, optionally, the breadboard can also be achieved by pivoting and clipping, so that this structure also permits very tight devices. Instead of screwing or latching, the frame can also be closed by means of a clamping bracket lock or a lever with link guide, in particular a lever which builds up different forces via two different links at different angular positions of the lever. In this context, reference may be made to the German application of the applicant with file number DE 10 2018 218 426, which has not been pre-published.

According to an extraordinarily favorable further development of the idea, it is thereby provided that the device and in particular the frame and the coupling housing or the breadboard and the coupling housing, if the latter is not formed integrally with the frame, are manufactured by die casting or preferably by injection molding. The frame and the coupling housing or the coupling housing with its breadboard may, for example, be manufactured by injection molding. They are then made of plastic according to the general understanding of the process of injection molding, this plastic can be fiber reinforced according to a very advantageous further development of the idea. Such a structure is simple and efficient to manufacture, even in large quantities. Alternatively, the breadboard with the coupling housing could also be manufactured from die casting, for example from zinc or aluminum alloys, as is quite common for coupling housings for plug connections. In principle, it would also be conceivable to realize the frame via die casting, i.e. from a metallic material.

In this case, the frame can be connected directly to the material surrounding the opening, for example the wall of a switch cabinet, a machine housing or the like. Alternatively, according to a very favorable design of the device according to the disclosure, it is possible that an intermediate frame is used, to which the actual frame is connected, in particular clipped or latched. The intermediate frame is then tightly connected, for example with an interposed seal, to the material surrounding the opening, for example the wall of a switch cabinet. It may, for example, be screwed to this material. The frame which is formed integrally with the coupling housing or which has the coupling housing in one of its slots on a breadboard can then be connected, for example latched, to this intermediate frame simply and efficiently.

In principle, various types of screw connection are conceivable as an alternative or also as a supplement to clamping with the at least one latch. For example, a union nut on the plug. However, in order to achieve a particularly good connection which, for example, also reliably withstands vibrations such as may occur, for example, in production machines or in railway operation, it can be provided in accordance with an advantageous further development of the device that the screw connection is made via a flange. For this purpose, the coupling housing, the part of the frame connected thereto and/or the breadboard comprise threaded holes or threaded pins. In this case, the plug housing of the plug connection comprises the flange which has holes or recesses corresponding to the threaded holes or the threaded pins. Thereover, the plug housing can be efficiently and securely screwed to the coupling housing or the parts surrounding it by means of screws or by means of nuts.

BRIEF DESCRIPTION OF THE DRAWINGS

Further advantageous designs of the device according to the disclosure also result from the exemplary embodiments, which are illustrated in more detail below with reference to the figures, wherein.

DETAILED DESCRIPTION

Figure 1:
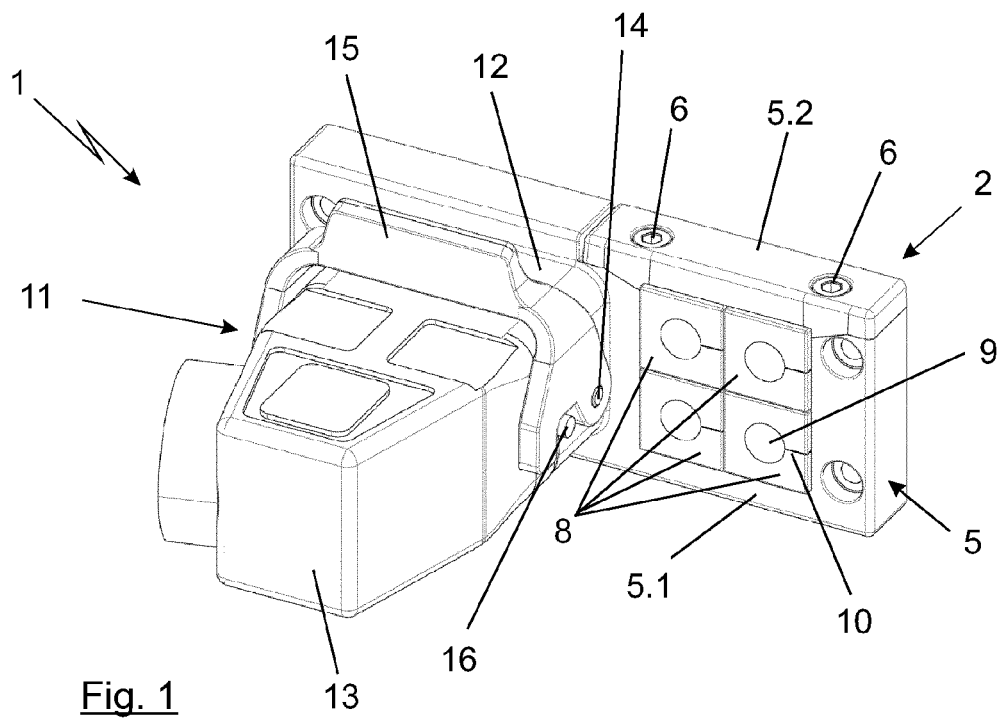
FIG. 1 shows a three-dimensional view of a line feed-in with a device in one embodiment according to the disclosure.
Figure 2:
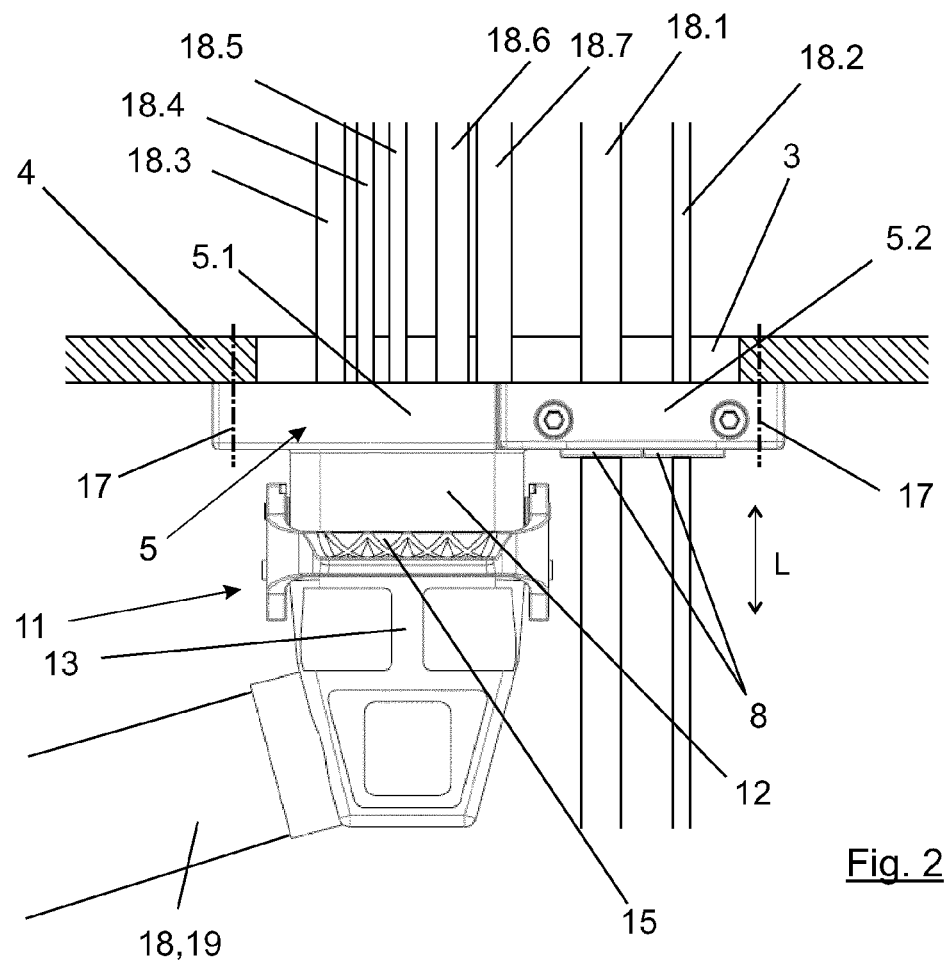
FIG. 2 shows the line feed-in from FIG. 1 installed around an opening in the wall of a switch cabinet.

The illustration in FIG. 1 shows a line feed-in 1 in a three-dimensional view. The line feed-in 1 comprises a device 2 according to the disclosure for the introduction of lines through an opening 3 shown in FIG. 2 in a wall 4, e.g. the wall 4 of a switch cabinet, a machine housing, a control device or the like. The device 2 comprises a frame 5 which, in the exemplary embodiment shown here, is made of two parts. A first frame part 5.1 is connected to a second frame part 5.2, which could also be referred to here as frame cover 5.2, via screws 6. Between the frame parts 5.2 and 5.1, slots 7 remain free, which can be seen very well for example in the illustration of FIG. 7, which again shows the device 2 alone. In the representation of FIGS. 1 and 2, these slots 7 are occupied by line grommets 8, which in the exemplary embodiment shown here are made of an elastic material, for example an elastomer, and which each show a through-opening 9 and a slot 10 for unfolding the integral line grommet 8. The through-opening 9 and the slot 10 are provided with reference signs only of one of the line grommets 8.

As a further integral part of the frame 5 or of the frame part 5.1, in the illustration of FIGS. 1 and 2 there is located to the left of the slots 7 or of the grommets 8 that fill them, respectively, a plug connection designated in its entirety as reference sign 11. A part of the frame 5 forms a coupling housing 12 of a coupling of this plug connection. The counterpart to this coupling or the coupling housing 12 is a plug, of which a plug housing 13 can be seen here. The shape of both the coupling housing 12, which is to be manufactured integrally with the frame 5, for example from fiber-reinforced plastic, by injection molding, is thereby adapted to the shape of the plug or its plug housing 13. The plug housing 13 and the coupling housing 12 can thereby be, for example, standardized or generally customary and thus quasi-standardized components. The structure further comprises a latch 15 rotatably pivotable about pins 14, which engages around projections 16 in the plug housing 13 in the closed position shown here. It thereby pretensions the plug housing 13 relative to the coupling housing 12 and holds the plug and coupling together. In particular, it presses sealing elements onto each other in the area of contact between the plug housing 13 and the coupling housing 12 in order to achieve a sealed structure.

The device 2 can once again be seen in the representation of FIG. 2, a sectional view through a wall 4, for example of a switch cabinet, in a view from above. The frame 5 is here connected to the wall 4 by means of screw connections 17 indicated in dotted lines and in particular a seal which is not visible here and which extends around the opening 3 and lies between the frame 5 and the wall 4. Lines which are here quite generally designated with reference sign 18 can now be led through the opening 3 into the interior of the switch cabinet. In the exemplary embodiment shown here, these are two lines 18.1, 18.2 which, for example as electrical supply lines, are passed through two of the grommets 8 or their through-hole 9 in the longitudinal direction L of the lines 18. They thus extend directly and undivided from the exterior of the switch cabinet into its interior.

The plug connection 11 is now preferably constructed in such a way that modular coupling inserts or corresponding modular plug inserts are provided inside both the coupling housing 12 and the plug housing 13. These can be individually configured and are accommodated, for example, in a module frame not shown here. This module frame is then located on the one hand in the coupling housing 12 and on the other hand in the plug housing 13 so that the coupling inserts and plug inserts form a connection when plug and coupling are plugged together. In the representation of FIG. 2, all lines 18.3 to 18.7 lead in a common sheath 19 into the plug housing 13, where they are divided accordingly among the plug inserts not shown here, which are designed, for example, to carry data, signals, electrical power, compressed air, cooling water, lubricant or the like. They are then connected via the plug inserts to the corresponding coupling inserts in the correspondingly constructed region of the coupling, so that they lead as individual lines 18.3 to 18.7 out of the coupling housing 12 again through the opening 3 into the interior of the switch cabinet. In this case, the lines 18.3 to 18.7 are shown open in the region of the opening 3 and the interior of the switch cabinet, again they could be surrounded by a common sheath 19. According to the exemplary embodiment shown here, for example, the line 18.3 is intended to transmit electrical power, the lines 18.4 and 18.5 are intended to transmit data or signals, and the lines 18.6 and 18.7 are intended to transmit compressed air.

Figure 3:
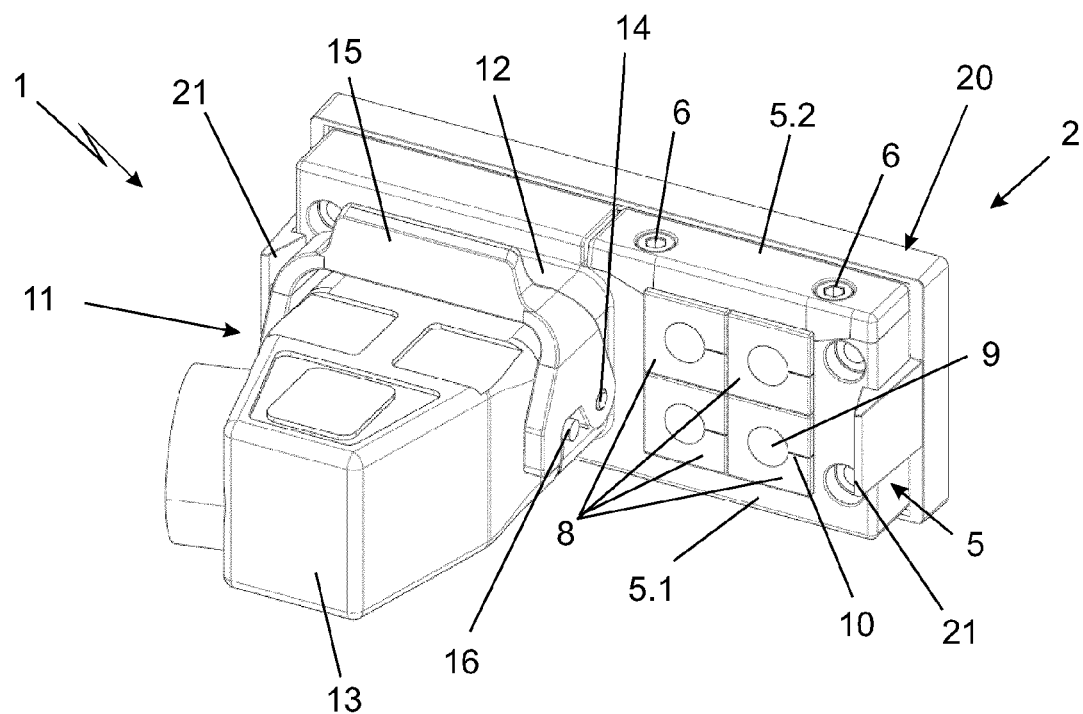
FIG. 3 shows an alternative design of the line feed-in according to FIG. 1.

The structure of the device 2 shown in FIG. 3 corresponds essentially to the structure described so far and is again shown in the form of the entire line feed-in 1 with plug fitted, but here without the cables 18. The device 2 now differs from the previously described structures by a special design in the region of the frame 5. This is not directly connected to the wall 4 of the switch cabinet, which is not shown here, by means of screw connections 17, but is inserted into an intermediate frame 20. For this purpose, latching hooks 21 are used which allow reliable latching of the frame 5 in the intermediate frame 20. The intermediate frame 20 itself is then connected to the wall 4, for example screwed, and may in turn comprise a seal between the intermediate frame 20 and the wall 4, as is generally known and customary. A seal between the frame 5 and the intermediate frame 20 is of course also conceivable.

Figure 4:
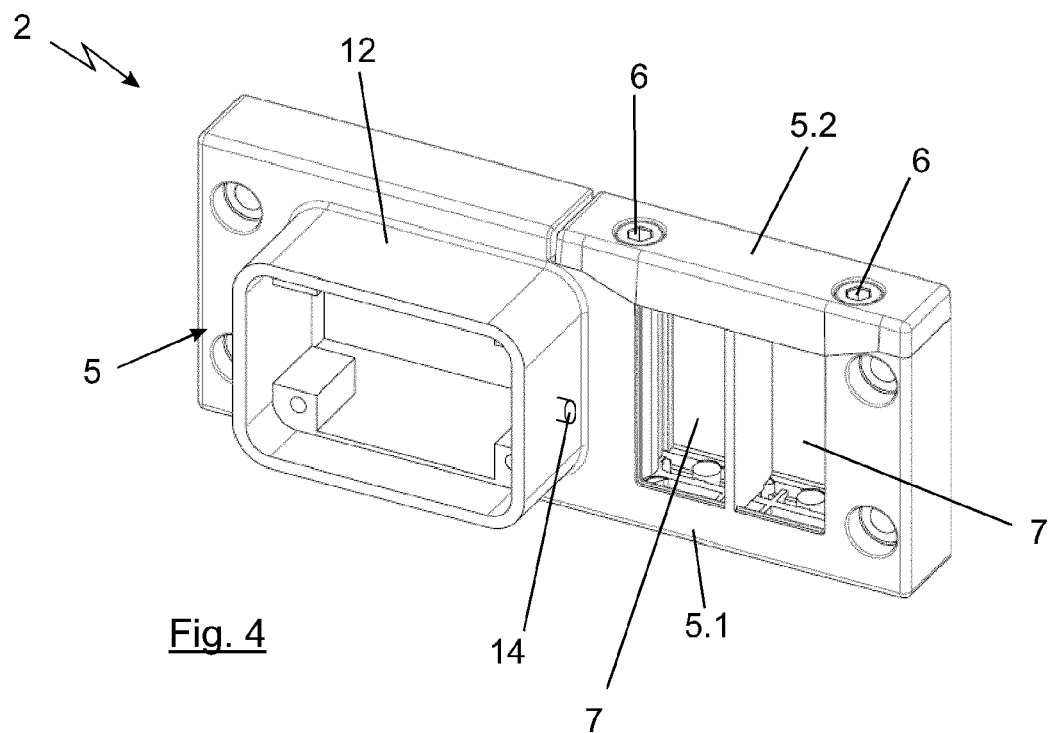
FIG. 4 shows the basic structure of the device according to the disclosure from a line feed-in according to FIG. 1 in a three-dimensional view.

In the representation of FIG. 4, the actual structure of the device 2, which has always been shown so far within the entirety of the line feed-in 1, can now be seen. The structure is shown free of grommets 8, the plug housing 13, the latch 15 and optionally coupling modules and a module frame inside the coupling housing 13. In this regard, the structure of the device 1 is an integral frame part 5.1 comprising the lower part of the frame 5 as well as the coupling housing 13. The entire component, as well as the part 5.2 of the frame 5 designated as the frame cover, may be manufactured by injection molding from a plastic, preferably a fiber-reinforced plastic. The structure is thus sufficiently stable to reliably press the four elastic grommets 8 in the two slots 7, which can be seen very clearly here, in order to achieve a seal and strain relief for the cables accommodated by them. The frame part 5.1 is integrally made with the coupling housing 13, so that no leakage can occur between the frame 5 and the coupling housing 13. This has the distinct advantage that the structure can be sealed very easily and efficiently. In particular if between the coupling housing 12 and the plug housing 13, which is not to be seen in the representation of FIG. 4, corresponding sealing elements, which are also not to be seen here, are arranged.

Figure 5:
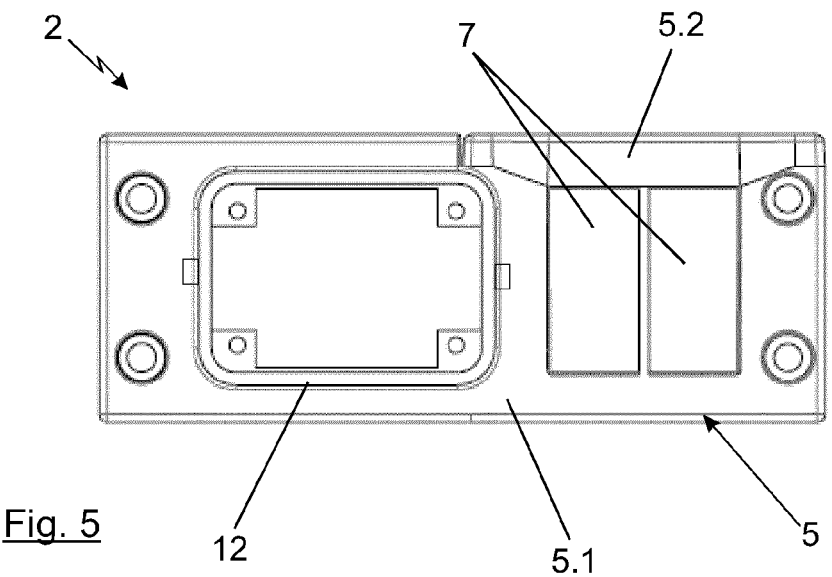
FIG. 5 shows a front view of the device according to FIG. 4.
Figure 6:
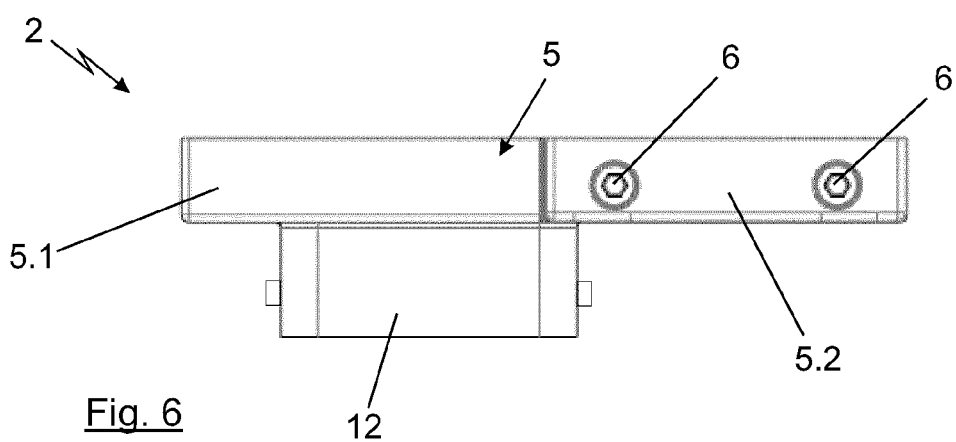
FIG. 6 shows a top view of the device according to FIG. 4.

The structure shown in FIG. 4 can be seen again in a side view and in a top view in relation to the illustrations in FIGS. 5 and 6, but here without the wall 4 of the switch cabinet. The overall construction of the device 2 in the manner described here now makes it possible to accommodate various plug-in systems in the region of the plug connection, and thus in the region of the coupling housing 13, which is part of the device 2. Thus, in one and the same device 2, the feed-in of uninterrupted lines 18 via the line grommets 8 in the slots 7 can be realized and, at the same time, a plug connection can be established via the coupling housing 12 in order to guide pluggable lines 18 through one and the same opening 3 in the wall 4 of the switch cabinet. This can all be carried out with a single opening 3 in the wall 4 of the switch cabinet, and is thus exceptionally simple and efficient. Optionally, it is still possible to select on site which of the lines 18 are suitable for a plug connection and which should be led directly into the switch cabinet, for example for reasons of susceptibility to interference, due to the high electrical power to be carried out or the like.

It is obviously conceivable to use other coupling housings in addition to the geometric structure of the coupling housing 12 shown here as an example, for example in order to implement another coupling instead of the coupling constructed from modular coupling inserts, for example the coupling of a standardized data interface, a standardized electrical interface or another transfer interface for power, signals and/or media. Standardized sockets may also be incorporated into the coupling housing 12, for example LAN sockets, USB sockets, power sockets or the like, if the coupling housing 12 is appropriately configured.

Figure 7:
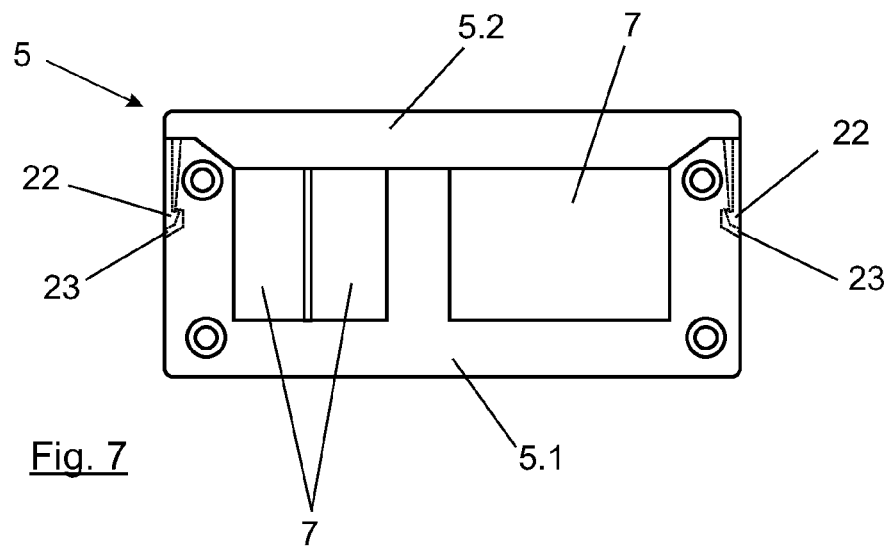
FIG. 7 shows an alternative frame.

In the previous exemplary embodiments, the connection of the frame parts 5.1 and 5.2 was always realized via the screws 6. This is not the only possible embodiment. In the illustration of FIG. 7, an alternative frame 5 can be seen which has three slots 7, wherein the slot 7 shown here on the right does not comprise any intermediate webs. The frame 5 again comprises a first frame part 5.1 shown here below and a frame part designated 5.2, which could also be referred to as a frame cover. The latter is not screwed to the lower part as in the Figs. shown so far. Rather, it has latching hooks 22 which are indicated in its interior and engage in corresponding openings 23 of the other frame part 5.1, so that the two frame parts 5.1 and 5.2 are latched together when pressed together. This principle of connecting the frame parts 5.1 and 5.2 is also fundamentally known from the applications of the applicant. For example, reference may be made in this connection to EP 2 746 634 A1. Furthermore, reference can be made in this context to the German patent application with file number DE 10 2018 205 702 of the applicant, which has not been published before and which also shows such a latching, there exemplarily with two latching steps.

Further alternatives are also conceivable both in the embodiment described so far and in the embodiment described below. In principle, an integral frame can be used, in which the grommets are inserted in the longitudinal direction L of the lines, or the frame can be divided into two parts and, instead of being screwed or latched, can be closed by means of a clamping bracket lock or a lever with link guide, in particular a lever which builds up forces of different magnitudes via two different links at different angular positions of the lever. In this context, reference may be made to the German application of the applicant with file number DE 10 2018 218 426, which has not been pre-published.

Figure 8:
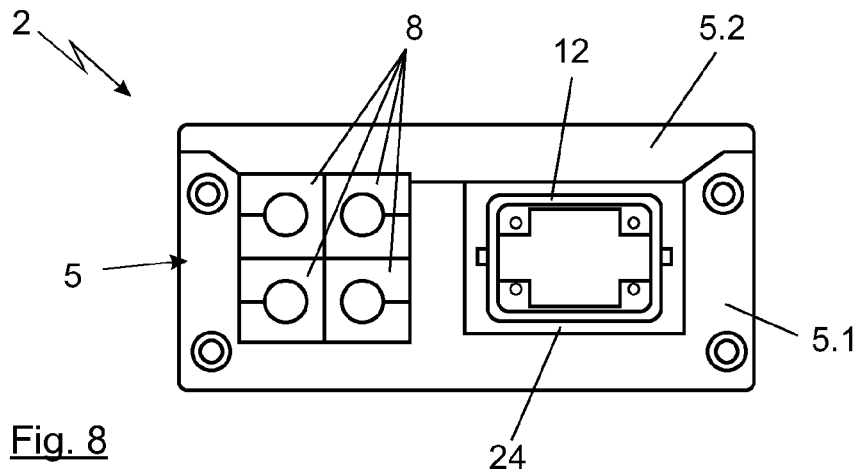
FIG. 8 shows an embodiment of the device according to the disclosure with the alternative frame of FIG. 7.

The frame 5 shown in FIG. 7 can now be used in a similar way to the frame 5 shown in the previous figures, which was formed integrally with the coupling housing 12. For this purpose, the frame can again be provided with grommets 8 in the area of the two slots 7 shown on the left, as can be seen in the top view of FIG. 8. The slot 7 shown on the right is provided with the coupling housing 12, which in this case is integrally formed with a breadboard 24. This structure can be seen in the coupling housing and the breadboard 24 can also be seen in the representation of FIG. 9 once again, in a three-dimensional view. The structure of the coupling housing 12 corresponds to the structure of the coupling housing 12 described so far, so that the plug with the plug housing 13 from FIGS. 1 to 3 can also be used here again. Instead of the integral design with the frame 5, or the frame part 5.1, the coupling housing 12 is designed here integrally with a breadboard 24 which fits precisely into the slot 7 and thus, in the exemplary embodiment shown here, correspondingly replaces, for example, six grommets 8 which can otherwise be arranged in this slot 7. The frame 5 may thus be a standardized frame 5, which only becomes the described device 2 when the coupling housing 12 is inserted on the breadboard 24. The coupling housing 12 and the breadboard 24 can again be injection molded, for example from a fiber-reinforced plastic material. In particular in this embodiment of the disclosure, but in principle also in the previously described embodiment, it is also conceivable to manufacture by die casting, for example with a breadboard 24 or a frame 5 and the coupling housing 12 made of a suitable alloy, for example of zinc or aluminum, which is quite common for such coupling housings 12.

Figure 9:
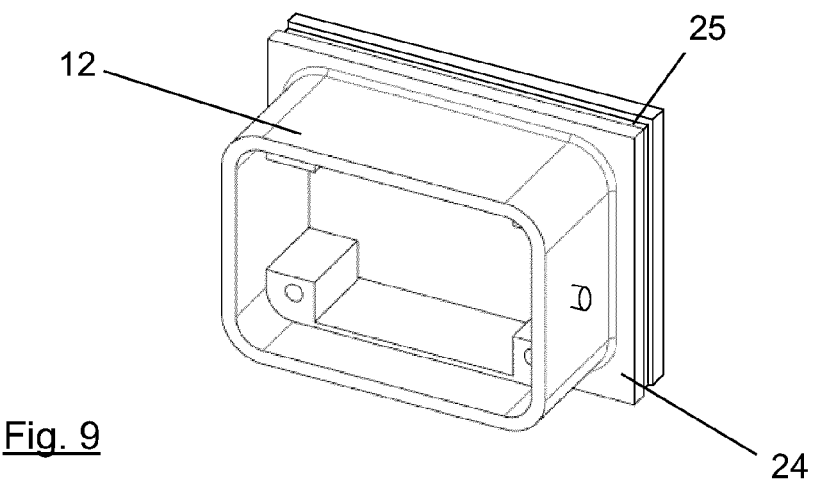
FIG. 9 shows a component from the device according to FIG. 8 in a three-dimensional view.
Figures 10, 11:
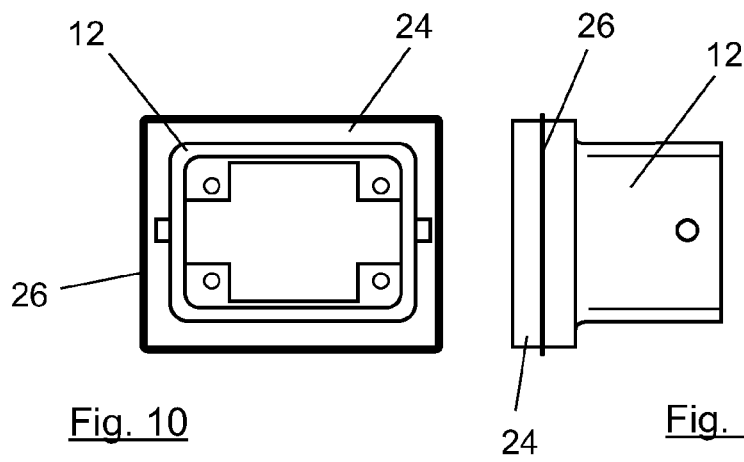
FIG. 10 shows a front view of the component according to FIG. 9.
FIG. 11 shows a side view of the component according to FIG. 9.

In the illustration of FIG. 9, it can be clearly seen that the breadboard 24 has a circumferential groove designated with reference sign 25. This groove may be provided to accommodate a seal 26 shown in FIGS. 10 and 11, a front view and a side view of the breadboard 24 and the coupling housing 12. This seal 26 ensures a seal between the frame 5 and the breadboard 24. Without an inserted seal 26 or a seal 26 molded onto the breadboard 24, sealing problems could possibly arise, in particular if the material of both the frame 5 and the breadboard 24 is comparably hard and accordingly no elastic deformation is possible. The seal 26 compensates for this accordingly, so that a good seal is possible even with such structures due to the possibility of elastically deforming the seal 26.

With a correspondingly attached latch 15, which can be made of plastic or sheet metal, for example, and a plug housing 13 held by it, which is pressed against the coupling housing 12, a very tight structure is possible, the tightness of which is ultimately limited by the weak point of the plug connection 11, but typically still permits tightness up to IP67.

Figure 12:
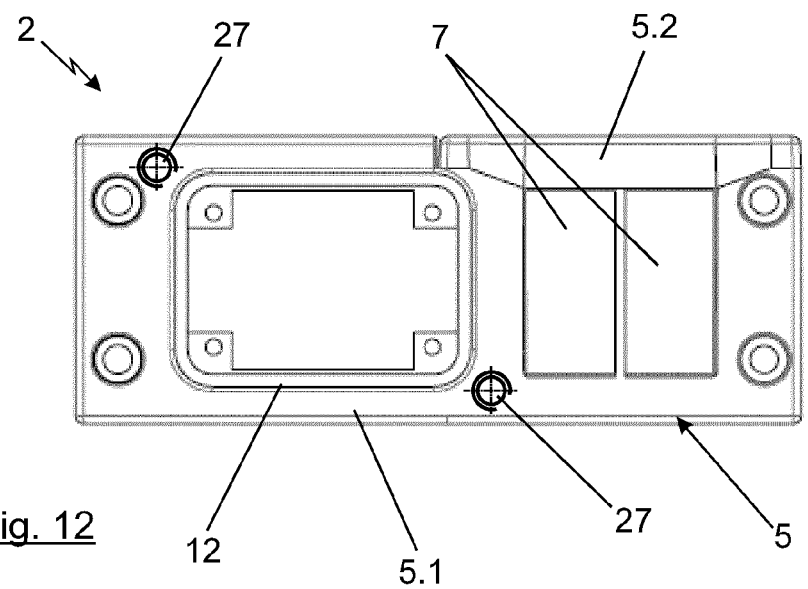
FIG. 12 shows another embodiment of the frame similar to the view in FIG. 5.
Figure 13:
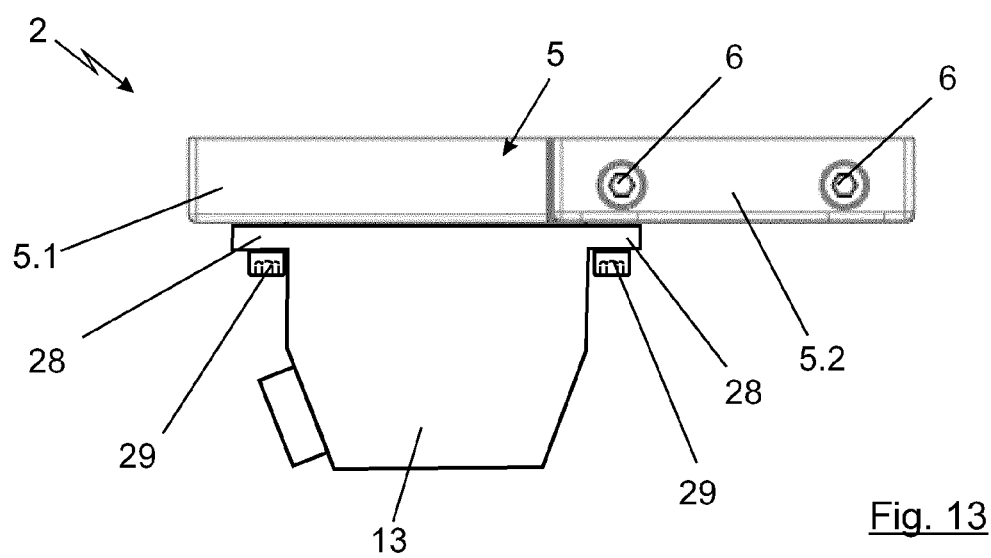
FIG. 13 shows a top view of this other embodiment, analogous to that in FIG. 6.

A screw connection may also be used in place of the latch 15. In the illustration of FIGS. 12 and 13 such are shown purely by way of example. In FIG. 12, which is otherwise to be understood analogously to FIG. 5, threaded holes 27 can be seen in the region of the frame or its part 5.1. By way of example only, these are arranged diagonally offset from one another to the right and left of the coupling housing in part 5.1 of the frame 5. They could just as well be arranged in the area of the coupling housing 12 itself or in the area of the breadboard 24 in an embodiment analogous to that shown in FIG. 8 *ff*. The coupling housing 12 shown in FIG. 13 then has a flange 28, at least in the region in which the threaded holes 27 are located. Via recesses or holes in the flange 28, the plug housing 12 can then be fixed to the part 5.1 of the frame 5 by means of screws 29. This would be possible analogously with also threaded pins on the frame 5 and screw nuts on the side of the flange 28 facing away from the frame 5.

The invention claimed is:

1. A device for introducing lines through an opening, comprising a frame arranged directly or indirectly around the opening and having slots for elastic grommets to receive the lines, wherein at least one coupling housing of at least one coupling of a plug connection is integrally formed with at least one part of the frame or with a breadboard matching one of the slots, wherein the coupling housing, the part of the frame connected thereto and/or the breadboard are adapted to be screwed to a plug housing of a plugged-in plug of the plug connection or to be clamped with at least one latch.

2. The device according to claim 1, wherein the coupling housing or the plug housing has at least one latch which is designed to clamp and hold the plug of the plug connection in the direction of the coupling when the plug is inserted.

3. The device according to claim 2, wherein the at least one latch is designed to be pivotable.

4. The device according to claim 1, wherein the elastic grommets for receiving the lines each comprise a single piece having a slot.

5. The device according to claim 1, wherein the elastic grommets for receiving the lines and/or the breadboard can be plugged into the slots of the frame in a form-fitting manner on at least two of their side edges.

6. The device according to claim 1, wherein the breadboard comprises sealing elements on at least one of the surfaces cooperating with the frame.

7. The device according to claim 1, wherein the frame is designed to be divisible transversely to the longitudinal direction of the lines, with a first frame part and a second frame part closing the slots.

8. The device according to claim 7, wherein the first frame part and the second frame part are detachably connectable.

9. The device according to claim 1, wherein the frame and the coupling housing or the breadboard and the coupling housing are produced by die casting or preferably injection molding.

10. The device according to claim 1, wherein the frame and the coupling housing or the breadboard and the coupling housing, and in particular the frame, are made of plastic.

11. The device according to claim 10, wherein the plastic is designed in a fiber-reinforced manner.

12. The device according to claim 1, wherein the frame is indirectly arranged around the opening via an intermediate frame, wherein the frame can be latched to the intermediate frames.

13. The device according to claim 1, wherein the coupling housing, the part of the frame connected thereto and/or the breadboard have threaded holes or threaded pins, wherein the plug housing of the plug connection comprises a flange which has bores or recesses corresponding to the threaded holes or the threaded pins.

14. The device according to claim 2, wherein the elastic grommets for receiving the lines each comprise a single piece having a slot.

15. The device according to claim 3, wherein the elastic grommets for receiving the lines each comprise a single piece having a slot.

16. The device according to claim 1, wherein the elastic grommets for receiving the lines each comprise a single piece having a slot.

17. The device according to claim 2, wherein the elastic grommets for receiving the lines and/or the breadboard can be plugged into the slots of the frame in a form-fitting manner on at least two of their side edges.

* * * * *